United States Patent
Lim et al.

(10) Patent No.: US 8,218,478 B2
(45) Date of Patent: Jul. 10, 2012

(54) APPARATUS, AND ASSOCIATED METHOD, FOR FACILITATING COMMUNICATION CONNECTION BETWEEN A MOBILE STATION AND A COMMUNICATION NETWORK

(75) Inventors: Miranda Bing Ying Lim, Brossard (CA); Steve Michael Hanov, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1075 days.

(21) Appl. No.: 11/680,066

(22) Filed: Feb. 28, 2007

(65) Prior Publication Data
US 2008/0207257 A1 Aug. 28, 2008

(51) Int. Cl.
*H04W 4/00* (2009.01)
*H04W 40/00* (2009.01)

(52) U.S. Cl. ....................... 370/328; 455/448
(58) Field of Classification Search ............ 455/434, 455/436–444, 448; 370/328, 331, 338
See application file for complete search history.

(56) References Cited

U.S. PATENT DOCUMENTS

| 2005/0153684 A1* | 7/2005 | Rodrigo ................. 455/411 |
| 2005/0272466 A1* | 12/2005 | Haverinen et al. ....... 455/552.1 |
| 2006/0077986 A1* | 4/2006 | Rune ...................... 370/401 |
| 2006/0094427 A1* | 5/2006 | Buckley et al. .......... 455/434 |
| 2006/0166699 A1* | 7/2006 | Aghvami et al. ......... 455/552.1 |

OTHER PUBLICATIONS

"3rd Generation Partnership Project:Technical Specification Group Core Network and Terminals; Numbering, addressing and identification (Release 7) (3GPP TS 23.003 V7.2.0 (Dec. 2006)", Dec. 2006, pp. 1-52, XP002443087, Internet Article (URL:http://www.3gpp.org/ftp/Specs/archive/23-series/23.003-720.zip).

* cited by examiner

*Primary Examiner* — Michael Faragalla

(57) ABSTRACT

Apparatus, and an associated method, for forming a communication connection between a mobile station and a communication network. The communication network is of either of two protocol versions, such as a UMA-compliant network and a GAN-compliant network. A network access identifier is formed at the mobile station of a format that permits its acceptance by the communication network. If a first network access identifier is formed of a format that is incompatible with the protocol version of the communication network, a subsequent network access identifier is formed of the format of the other of the protocol versions. A listing is maintained at the mobile station that identifies the determined protocol version of the communication network.

20 Claims, 3 Drawing Sheets

APPARATUS, AND ASSOCIATED METHOD, FOR FACILITATING COMMUNICATION CONNECTION BETWEEN A MOBILE STATION AND A COMMUNICATION NETWORK

The present invention relates generally to a manner by which to provide for formation of a communication connection between a mobile station and a communication network in which the communication network is operable pursuant to one of two protocol versions, such as a UMA (Unlicensed Mobile Access) technology or a successor, GAN (Generic Access Network) technology. More particularly, the present invention relates to apparatus, and an associated method, by which to generate signaling messages to permit formation of the communication connection when the communication network operates in conformity with either of the protocol versions.

A network address identifier, or other access message, of a first syntax is first sent. If the message fails to result in a communication connection, then the message, of a second syntax, is sent. A listing is maintained of which of the syntaxes provides for the communication connection. And, the information stored at the listing is subsequently utilized pursuant to subsequent procedures, both pursuant to a current communication session as well as during subsequent communication sessions.

BACKGROUND OF THE INVENTION

Advancements in communication and processing technologies have permitted the development and deployment of radio communication systems that are permitting of the communication of data at high, and variable, communication rates. For many, ready access to such radio communication systems is an everyday necessity.

Cellular communication systems are exemplary of such radio communication systems, made possible by, and taking advantage of, such advancements. Successive generations of cellular communication systems have been developed and deployed with each new generation providing additional communication capabilities. For instance, early-generation, cellular communication systems primarily provided voice communication services and only limited data services. Successor-generation, cellular communication systems provide for increasingly high-speed data communication services in addition to voice communication services.

Additionally, the advancements in communication and processing technologies is providing for convergence of disparate systems and technologies. For instance, fixed, i.e., wireline, communication systems and services are converging with those of cellular, and other mobile radio, systems and services. Standard-setting bodies have promulgated standardized protocols, for instance, pertaining to cellular/Wi Fi convergence. UMA (Unlicensed Mobile Access) protocols were specified by a UMA technology group. The UMA technology defines, amongst other things, a manner by which to provide GSM/GPRS (Global System for Mobile communications/General Packet Radio Service) communication services by way of a Wi Fi connection to a packet data network. The UMA protocols were subsequently adopted by a 3GPP (3$^{rd}$ Generation Partnership Project) standard-setting body. And, the protocols are renamed therein as GAN (Generic Access Network) protocols. Revisions, and other changes, have since been made to the GAN protocols. In general UMA/GAN functionality is provided through use of a WLAN (Wireless Local Area Network) access point, a fixed-site transceiver with which a UMA/GAN capable, mobile station communicates. The access point is connected to a UMA network controller (UNC) or the like by way of, e.g., a packet data network, such as the internet. The lower logical layers of a UMA/GAN mobile station correspond to the corresponding layers of a GSM network and handoffs are permitted between a GSM base station and a WLAN access point. In both a cellular system and a UMA/GAN system, security procedures are required to be carried out to ensure that a mobile station is authorized to communicate with the cellular or UMA/GAN network.

UMA/GAN protocols define access procedures and signaling, required for a communication connection with a mobile station. While the UMA protocols and GAN protocols exhibit significant commonalities, there also are differences, including differences caused, as above-noted, by subsequent changes to the GAN protocols. Such differences result in various incompatibilities. For instance, a mobile station operable in conformity with UMA protocols is sometimes unable to gain access to, and form a communication connection with, a GAN network. And, vice versa, a GAN-compatible mobile station is unable to gain access to, and form a communication connection with, a UMA network.

If, however, a manner could be provided by which to overcome the access incompatibility, and other incompatibilities, a mobile station would be able to communicate by way of a UMA/GAN network, irrespective of its protocol version.

It is in light of this background information related to mobile communication systems that significant improvements of the present invention have evolved.

DETAILED DESCRIPTION

Figure 1:
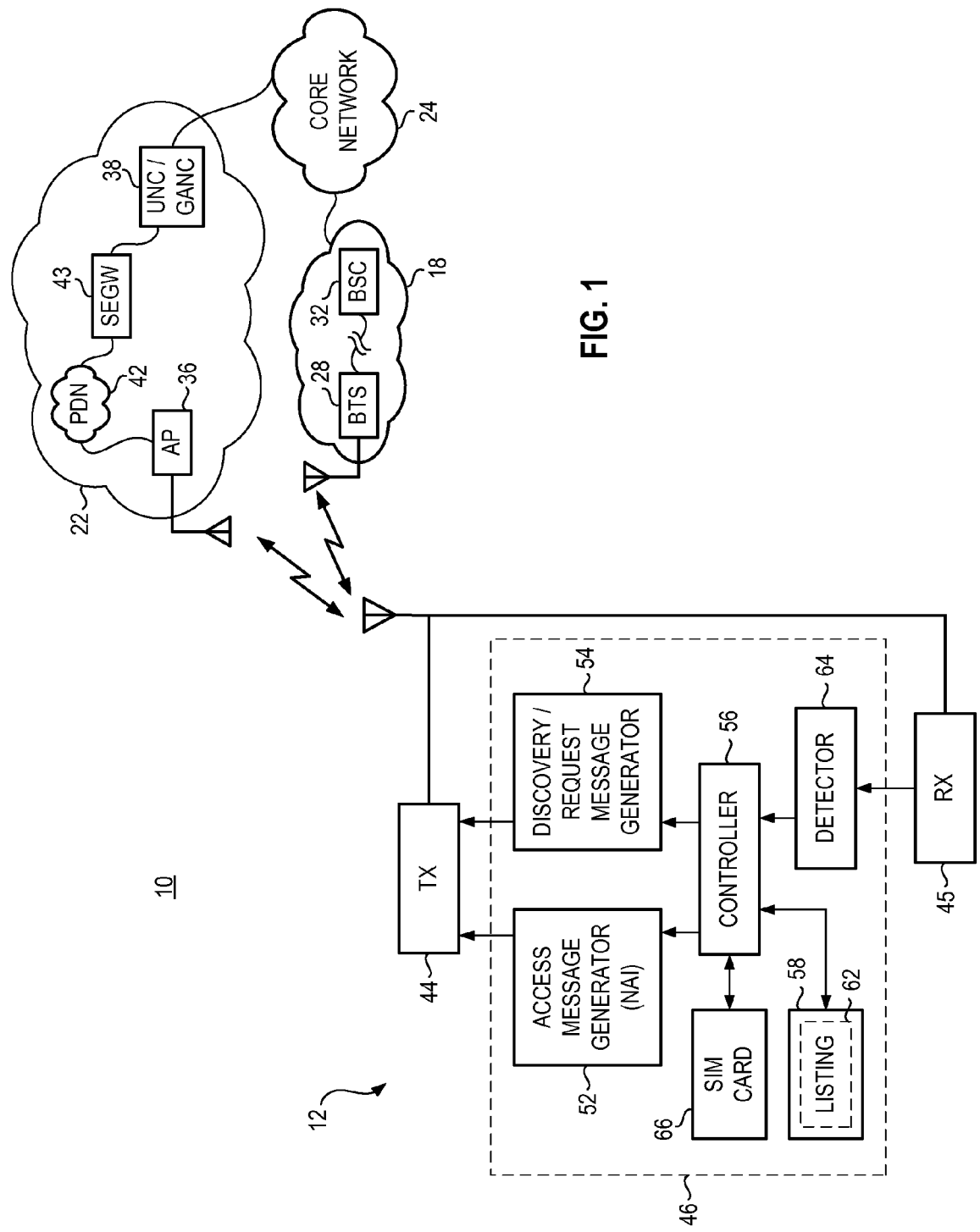
FIG. 1 illustrates a functional block diagram of a radio communication system in which an embodiment of the present invention is operable.

The present invention, accordingly, advantageously provides apparatus, and an associated method, by which to provide for formation of a communication connection between a mobile station and a communication network operable pursuant to one of either of two protocol versions, such as a UMA-network or its successor, a GAN-network, operable in conformity with their respective signaling protocols.

Through operation of an embodiment of the present invention, a manner is provided by which to generate signaling messages to permit formation of the communication connection when the communication network operates in conformity with either of the protocol versions.

In one aspect of the present invention, an NAI (Network Access Identifier) or other access message of a first syntax is first sent by the mobile station. If the message fails to result in a communication connection, then the message, of a second syntax, is sent.

In another aspect of the present invention, a listing is maintained of which of the access messages, and their associated syntactical formations, permits the formation of a communication connection. The listing is accessed, and information listed therein, is used during a current, or subsequent communication session. And, contents of the listing are updated, as needed.

In another aspect of the present invention, a network access identifier is provided that generates a network access identifier pursuant to the communication-connection procedures. The syntax of the network access identifier is different in a UMA-compliant system than in a GAN-compliant system. The UMA-compliant syntax of a network access identifier is required to be received by a UMA network for a communication connection with a mobile station. If the UMA network instead receives a GAN-formatted NAI, then the communication connection fails. Analogously, the GAN-compliant syntax of a network access identifier is required to be received by a GAN-compliant network for a communication connection with a mobile station. If a GAN-compliant network instead receives a UMA-formatted network access identifier, than the communication connection also fails.

The network access identifier generator is capable of generating both a network access identifier that includes UMA-compliant syntax and a network access identifier that includes a GAN-compliant syntax.

In another aspect of the present invention, a selected first one of the UMA-formatted network access identifier and GAN-formatted network access identifier is formed and caused to be communicated by the mobile station pursuant to a communication connection procedure. If the network access identifier is accepted, then the communication network is known to be compliant with the protocols corresponding to the syntactical format of the already-sent network access identifier accepted by the network. If, conversely, the communication connection fails, the network access identifier generator forms another network access identifier message that is formatted pursuant to the other of the syntactical formats. And, a communication connection is thereafter formable as, presumptively, the communication network is operable in conformity with the other protocol versions.

Information used to populate parts of the network access identifier is retrieved from a SIM-card (Subscriber Identity Module), or other memory device, embodied at the mobile station.

In another aspect of the present invention, a listing is created and maintained at a memory element of the mobile station. The listing indexes together identities of communication networks and their respective protocol version pursuant to which such associated communication networks are determined to be operable. The listing is populated during operation of the mobile station. The mobile station identifies the communication network, such as by a network identifier broadcast by an element of the communication network. And, when the network access identifier formatted using the syntax of a selected one of the protocol versions is successfully utilized in the formation of a communication connection, the protocol version pursuant to which the communication network is operable is thereby determined. And a field of the listing is populated with the protocol version. The listing is subsequently accessible, thereby to provide an indication of the protocol version pursuant to which the communication network is operable. And, the listing is updateable, as needed.

In another aspect of the present invention, the listing is accessed to determine protocol discriminator values to be used in a discovery request or register request, also generated by the mobile station. The syntactical format of the discovery request and register request is dependent upon the protocol version, i.e., a UMA or GAN, network. Through the determination of the protocol version pursuant to generation of the network access identifier, the correct syntax of the subsequent request messages is immediately available.

Thereby, a manner is provided by which to permit a mobile station to form a communication connection with a communication network of either of the protocol versions, i.e., a UMA-compliant network or a GAN-compliant network. Incompatibilities that would otherwise prevent a formation of a communication connection are obviated.

In these and other aspects, therefore, apparatus, and an associated method is provided to facilitate formation of a communication connection. An access message generator is configured to generate an access message selectably having first content and second content. The access message is generated to initiate formation of the communication connection. A content reselector is operable responsive to failure of formation of the communication connection responsive to generation by the access message generator of the access message having a first selected one of the first content and the second content. The content reselector is configured to select a second selected one of the first content and the second content and to instruct the access message generator to generate the access message having the second selected one of the first and second content to reattempt initiation of formation of the communication connection.

Referring first, therefore, to FIG. 1, a radio communication system, shown generally at 10, provides for radio communications with mobile stations, of which the mobile station 12 is exemplary. The mobile station 12 here forms a convergent device, capable of operation in a GSM (Global System for Mobile communications) and in a UMA/GAN (Unlicensed Mobile Access/Generic Access Network) system. And, the network part of the communication system is shown to include a GSM network 18, a UMA/GAN network 22, and a core network 24. The UMA/GAN network is representative of a Wi Fi, or other, network operable in conformity with UMA or with GAN protocols. As noted above, the UMA and GAN protocols are, in significant part, different protocol versions of the same fundamental protocol scheme. The protocols differ, however, in manners that would prevent a mobile station from forming a communication connection with the network 22. If signaling generated by the mobile station is in compliance with a protocol version other than the protocol version pursuant to which the network 22 is operable, a convergent mobile station, of conventional construction, would be unable to be permitted to form a communication connection with the network 22. Operation of an embodiment of the present invention provides a manner by which the mobile station operates to provide for the formation of a communication connection irrespective of which of the protocol versions pursuant to which the network 22 is operable.

The GSM network is shown to include a base transceiver station (BTS) 28 and a base station controller (BSC) 32. And, the network 22 is shown to include an access point (AP) 36 and a controller 38, here interconnected by way of an internet connection 42 via a security gateway (SEGW) 43.

In conventional manner, communications are carried out between the mobile station and the base transceiver station of the GSM network. Hand off of communications is permitted between base transceiver stations of the GSM network and, additionally, between the network 18 and the network 22. The mobile station 12 includes transceiver circuitry, here represented by a transmit (TX) part 44 and a receive (RX) part 45. The transceiver circuitry provides for communications with both the GSM network and with the UMA/GAN network 22.

The mobile station further includes apparatus 46 of an embodiment of the present invention that facilitates formation of a communication connection between the mobile station and the network 22 when the network is either of the UMA protocol version or the GAN protocol version. In contrast to existing convergent mobile stations otherwise capable of forming a communication connection with a UMA protocol version or, alternately, a GAN-protocol version network, the mobile station 12 including the apparatus 46 permits connection of the mobile station with the network 22 irrespective of which of two protocol versions pursuant to which the network operates. The apparatus 46 is functionally represented, implementable in any desired manner, including, for instance, algorithms executable by processing circuitry.

The apparatus is here shown to include an access message generator 52, a discovery and register request generator 54, a controller 56, a memory element 58 at which a listing 62 is maintained, a detector 64, and a SIM (Subscriber Identity Module) card 66, or other memory location.

In operation, an NAI (Network Access Identifier) forming an access message is first caused to be generated and transmitted by the transmit part of the mobile station. The network access identifier is one of either of two syntactical formats, a UMA-compliant format or a GAN-compliant format. If the NAI is of a syntactical format that corresponds to the protocol version of the network 22, then the NAI signaling procedure shall succeed. Conversely, if the NAI is of a syntactical format that differs with the protocol version of the network 22, then the signaling fails. In the event of failure of a first attempt using a network access identifier of a first format, then the NAI is, e.g., regenerated and transmitted, formed of the other of the syntactical formats. Three types of control are generally provided in UMA/GAN: provisioning, default, and serving. When communicating to a provisioning or a default UNC/GANC, the NAI is formed based upon information stored on the device at the time of manufacture, pertaining to a particular carrier. In this scheme, if the NAI is refused, no retry of an NAI with a different format is attempted. However, when communicating with a serving UNC/GANC, it is possible that the protocol versions of the two carrier networks are different. In this scheme, a retry with an NAI of a new format is attempted. The controller 56 controls operation of the access message generator, first to cause the access message generator to access the listing 62 of the memory element 58 to determine if the listing identifies the communication network with which the mobile station is to attempt to communicate is of a UMA protocol version or of a GAN protocol version. If the listing includes an identification, then the NAI caused to be generated by the access message generator is of a format corresponding to that accessed in the listing. Otherwise, if the listing does not provide such an indication, then the network access identifier is randomly arbitrarily selected or selected otherwise in a manner without knowledge of the protocol version pursuant to which the network 22 is operable. Additionally, in the formation of the network access identifier, contents stored at the SIM card 66 are accessed, and values stored there at are used to populate fields of the network access identifier.

When the network access identifier uses the UMA-format, the network access identifier forms a string of the form:
"1<IMSI>@uma.mnc<MNC>.mcc<MCC>.
  3gppnetwork.org".
The values of the IMSI (International Mobile Subscriber Identity), the MNC (Mobile Network Code), and MCC (Mobile Country Code) are retrieved from the SIM card 66. Additional details related to this NAI are found, e.g., in the document, UMA Stage 3 r1.0.4 Section 5.2.1. Analogously, when the network access identifier conforms with the GAN format, the network access identifier is a string of the form:
"1<IMSI>@gan.mnc<MNC>.mcc<MCC>.
  3gppnetwork.org".
Additional details related to this NAI are found, e.g., in 3GPP Document 23.003 Section 17.2.1.

The network access identifier, of whichsoever syntax, is communicated to a security gateway and detected by the security gateway thereof. The security gateway analyzes the contents of the message pursuant to IPSec authentication procedures. If the network access identifier is of a syntactical format that differs with the format defined by the protocol version pursuant to which the security gateway is compatible, then the authentication fails or times out, and the communication connection of the mobile station with the network is denied. Conversely, if the syntactical format of the message corresponds with that of the protocol version pursuant to which the network is operable, then the communication connection is permitted.

Indications are returned to the mobile station, received at the receive part 45, and detections thereof are made by the detector 64. In the event that the communication connection is permitted, indications are provided to the memory element 58 and the protocol version of the communication network is recorded, indexed against the identity of the network. By recording the protocol version of the communication network, in subsequent signaling, and subsequent communication connection attempts, a guess, or arbitrary selection, of the syntactical format by which to form a subsequent NAI, or other message, need not be made. Instead, the contents of the listing are accessed, and the identity of the protocol version of the network is immediately ascertained.

For instance, the different protocol versions of the network 22 further differ in the format of discovery request and register request messages. Each of these messages includes a 4-bit PD value. Details related to the PD value are set forth, e.g., in 3GPP document 44.318 section 11.1.1.2 and UMA Stage 3 R1.0.3 section 11.1.1.2.

When utilizing the UMA protocol version, the PD value is of a value of 1. However, using a GAN protocol version, the PD value is 0. According to further operation of an embodiment of the present invention, the discovery and request message generator 54 is further caused to form the respective messages in conformity with the protocol version of the network with which the mobile station forms a communication connection. A discovery message and a register request message are generated subsequent to successful communication of the network access identifier and storage at the listing of the protocol version of the communication network. When a discovery or register request message is to be generated, access is made of the listing, such as by operation of the controller 56 to access the contents and to provide the access contents to the message generator 54. Responsive to knowledge of the protocol version pursuant to which the communication network is compliant, the PD value of the message formed by the message generator 54 is appropriately populated. That is to say, if the listing indicates the communication network to be a UMA-compliant network, then the PD value of the message formed by the message generator 54 is of a value of 1. And, if the communication network is identified to be a GAN-compliant network, then the PD is populated with a value of 0. When the discovery or request message is formatted in conformity with the protocol version pursuant to which the communication network is compliant, then the message, when sent by the transmit part of the mobile station, is accepted and operated upon. That is to say, depending upon which NAI was successful, the mobile station configures itself to use either the GAN or UMA PD value in all further signaling to the network and its controller 38.

The listing 62 formed at the memory element 58. Wheresoever embodied, however, the listing forms a table identifying which of a UMA/NAI, or a GAN/NAI worked with a network with which a communication connection was attempted. Movement permitted of the mobile station permits a listing of multiple entries to be formed and maintained, accessible at any time in which a network access identifier, discovery message, request message, or other message that is protocol-version specific is to be generated. By forming, and subsequently accessing, the table, delays associated with use of an erroneous access identifier and subsequent lack of access granted by a security gateway need not occur. And, upon successful connection to a security gateway, the protocol version of the communication network is updated to record which of the network access identifier formats worked successfully. In future connections to the same communication network, the table formed of the listing indicates which network access identifier to use first. In one implementation, the table is indexed by the IP address of the secured gateway of the network. In other embodiments, indexing is provided in other manners, such as by the MNC/MCC (Mobile Network Code/Mobile Country Code), or similar identifier, of the communication network forming the target network.

Figure 2:
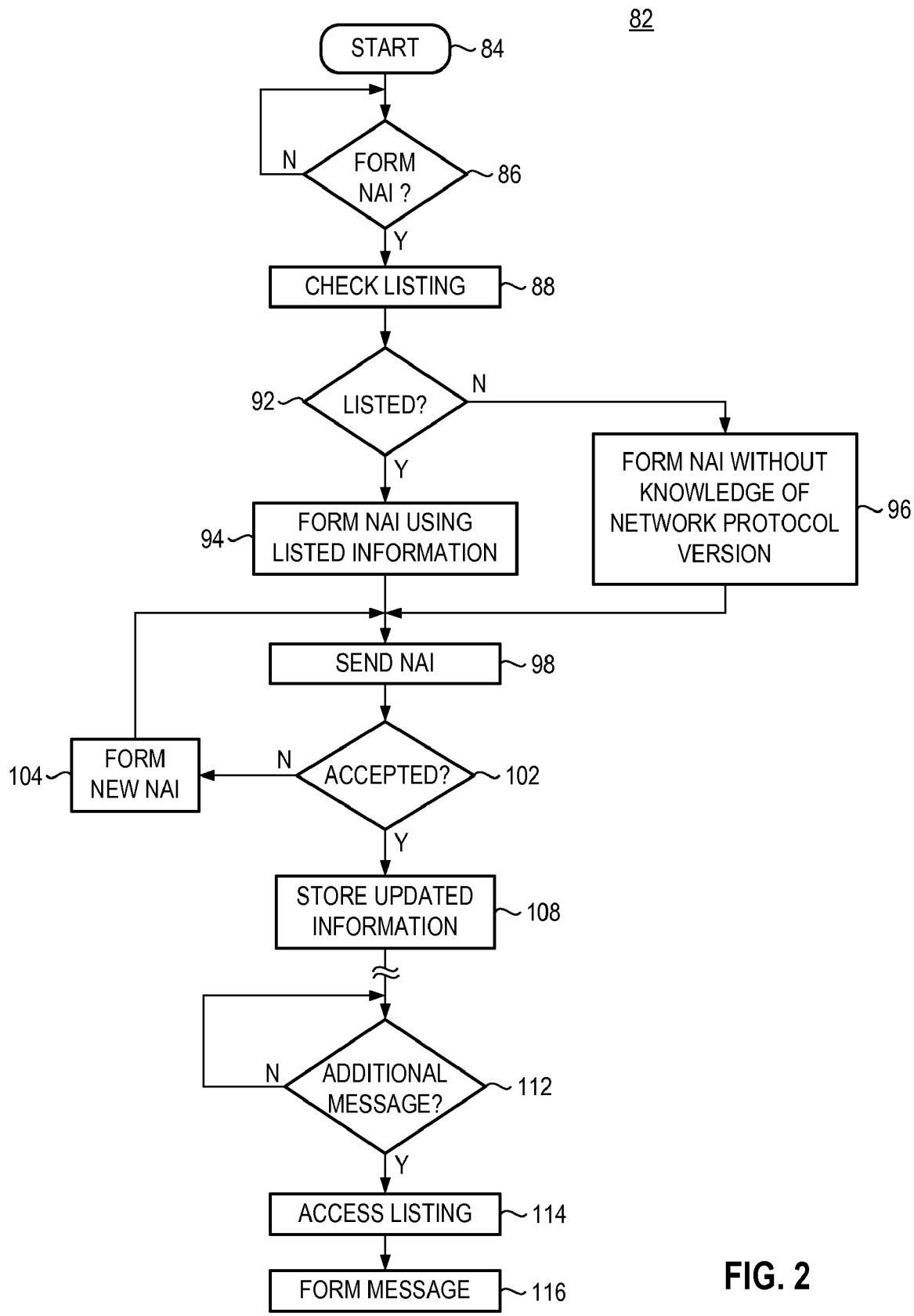
FIG. 2 illustrates a process diagram representative of the process of operation of an embodiment of the present invention.

Turning next to FIG. 2, a process diagram, shown generally at 82, represents the process of operation of an embodiment of the present invention. The process here pertains to operation with respect to a serving UNC/GANC scheme. The process starts at the start block 84. Then, a determination is made, as indicated at the decision block 86, as to whether a network access identifier (NAI) is to be formed. If not, the no branch is taken back to the decision block. Otherwise, the yes branch is taken to the block 88.

At the block 88, the contents of a listing forming a table indexing together communication networks and their associated protocol versions are accessed. A determination is made at the decision block 92 as to whether the protocol version of the network with which communications are to proceed is listed. If the network and its protocol version are listed, the yes branch is taken to the block 94. If not contained in the listing, the no branch is taken to the block 96. At the block 94, the network access identifier is formed using the information retrieved from the listing. Conversely, at the block 96, the network access identifier is formed without knowledge of the protocol version of the communication network. Paths are then taken to the block 98, and the network access identifier is sent to the communication network.

A determination is made at the decision block 102, as to whether the network access identifier is accepted. If not, the no branch is taken to the block 104, and a new access identifier is formed. In the exemplary implementation in which the communication network is of one of two protocol versions, a UMA-compliant version, and a GAN-compliant version, the NAI formed at the block 104 is of a format that is the remaining one, not previously formed. A path is taken back to the block 98, and the newly-formed access identifier is sent.

If the network access identifier is determined at the decision block 102 to be accepted, the yes branch is taken to the block 108. At the block 108, the protocol version associated with the accepted network access identifier is stored, if not already stored, at the listing of the memory element. A path is then taken to the decision block 112 at which a determination is made as to whether an additional message, such as a discovery request message or a register request message is to be generated. If not, the no branch is taken back to the decision block. Otherwise, if a subsequent message is to be generated, the yes branch is taken to the block 114, and the listing is accessed to obtain the protocol version of the communication network to which the subsequent message is to be sent. The accessed, protocol version is used at the block 116 to form the subsequent message.

Figure 3:
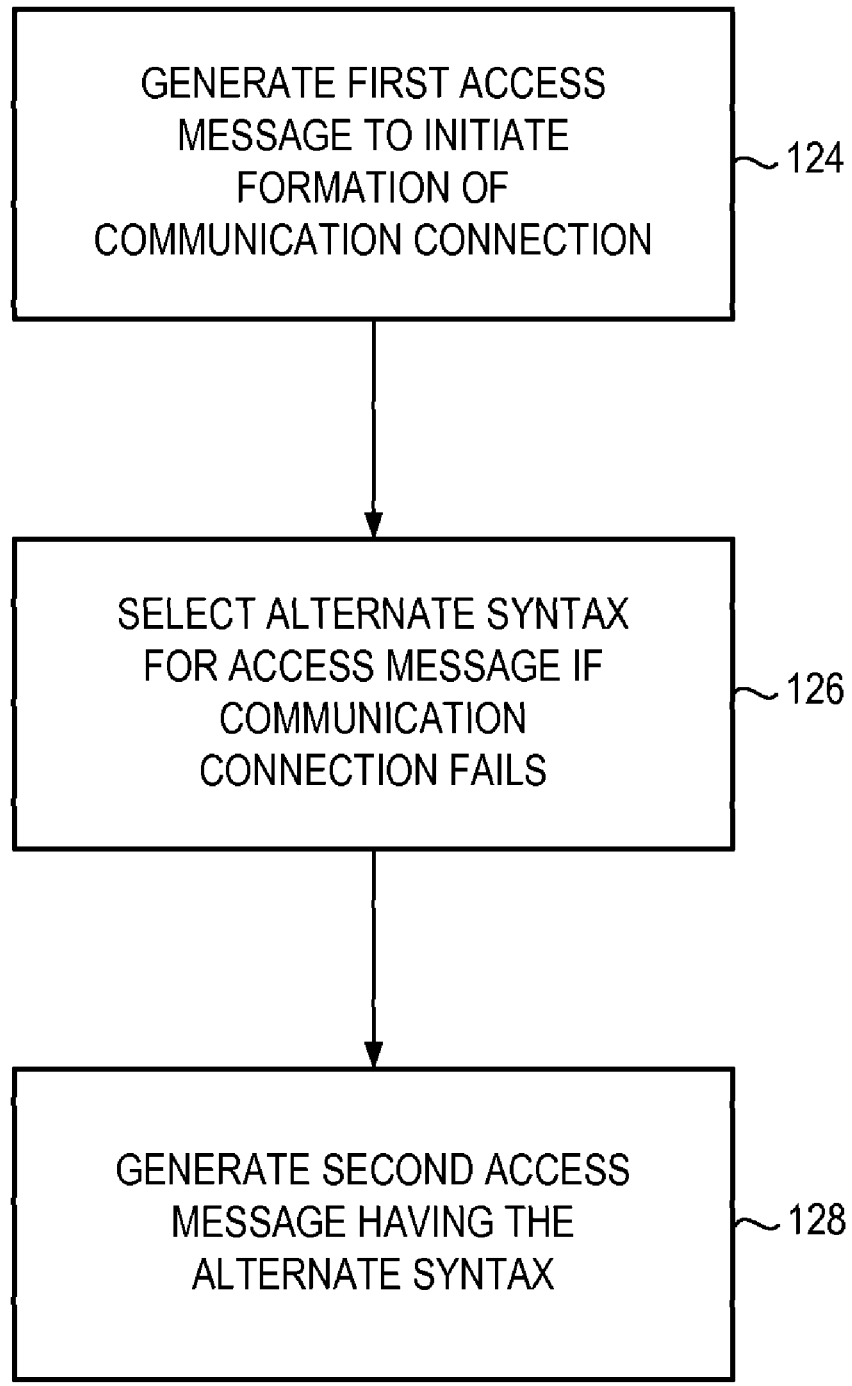
FIG. 3 illustrates a method flow diagram of the method of operation of an embodiment of the present invention.

FIG. 3 illustrates a method flow diagram, shown generally at 122, representative of the method of operation of an embodiment of the present invention. The method facilitates formation of a communication connection by a mobile station.

First, and as indicated by the block 124, an access message is generated. The access message selectably has a first selected one of first content and second content. The access message is used to initiate formation of the communication connection. Then, and as indicated by the block 126, a second selected one of the first content and the second content is selected responsive to failure of formation of the communication connection subsequent to generation of the first access message. Then, and as indicated by the block 128, the access message having the second selected one of the first and second content is generated to reattempt, thereby initiation of formation of the communication connection.

Thereby, a mobile station generates an access message permitting a communication connection to be formed with a communication network that is either UMA-compliant or GAN-compliant. Communication failure resulting from lack of compatibility between the mobile station and the communication network does not result. Additionally, due to the storage of the protocol version of the communication network, a network access identifier is formable to be of a syntactical format that permits the formation of a communication connection with little delay.

What is claimed is:

1. Apparatus for a mobile node station to facilitate formation, using an appropriate protocol, of a communication connection with a network, the mobile node station operable to selectively communicate according to either one of a first communication protocol and a second communication protocol, said apparatus comprising:

a memory element adapted to store a listing of networks and an indication of an associated protocol used for making a successful previous connection with networks previously encountered, said memory element configured to maintain a table identifying which of the first communication protocol and the second communication protocol results in success of the formation of the communication connection with the network;

an access message generator configured to generate a first access message to initiate formation of the communication connection with the network, the first access message having either one of a first syntactically formatted network access identifier or a second syntactically formatted network access identifier in accordance with the first communication protocol and the second communication protocol, respectively, selection of which of the first or second syntactically formatted network access identifier of the first access message made by access to the table; and a content reselector configured, responsive to failure of formation of the communication connection, to instruct said access message generator to generate a second access message having the other of the first content and second content in accordance with the other one of the first communication protocol and the second communication protocol so as to reattempt initiation of formation of the communication connection.

2. The apparatus of claim 1 wherein the first syntactically formatted network access identifier comprises a UMA, Unlicensed Mobile Access, syntax string.

3. The apparatus of claim 1 wherein the second syntactically formatted network access identifier comprises a GAN, Generic Access Network, syntax string.

4. The apparatus of claim 1 further comprising a connection success determiner configured to determine success of the formation of the communication connection responsive to the access message generator.

5. The apparatus of claim 1 wherein the network to which the mobile station is connectable comprises either a UMA, Unlicensed Mobile Access, -compliant network or a GAN, Generic Access Network,-compliant network.

6. The apparatus of claim 1 further comprising a connection success determiner configured to determine success of the formation of the communication connection responsive to the access message generator and further configured to update the table maintained at said memory element responsive to successful formation of the communication connection.

7. A method for facilitating formation, using an appropriate protocol, of a communication connection by a mobile station with a network, the mobile station operable to selectively communicate according to either one of a first communication protocol and a second communication protocol, said method comprising the operations of:
   maintaining a listing of networks and an indication of which of the first communication protocol and the second communication protocol results in formation of a successful communication connection with each network in the listing of networks,
   generating a first access message to initiate formation of the communication connection with the network, the first access message having either one of a first syntactically formatted network access identifier or second syntactically formatted network access identifier in accordance with the first communication protocol and the second communication protocol, respectively, selection of which of the first or second syntactically formatted network access identifier of the first access message made by access to the listing; and
   responsive to failure of formation of the communication connection subsequent to generation of said first access message, generating a second access message having the other of the first content and the second content in accordance with the other one of the first communication protocol and the second communication protocol to reattempt initiation of formation of the communication connection.

8. The method of claim 7 further comprising the operation of determining whether the communication connection is formed.

9. The method of claim 7 further comprising: accessing the listing of networks, and selecting either the first content or the second content responsive thereto.

10. The method of claim 7 wherein the second content is different than the first content.

11. The method of claim 7 comprising the further operation of sending a request message, the request message of a configuration dependent upon which access message, the first access message or the second access, results in successful formation of the communication connection.

12. The method of claim 7 wherein the first access message generated during said operation of generating the first access message comprises an NAI, Network Access Indicator.

13. A signaling method for a mobile station operable to communicate with a network constructed in conformity with a first protocol version or constructed in conformity with a second protocol version, said method comprising the operations of:
   generating a Network Access Identifier of a construction in conformity with the first protocol version forming first content of a first syntax to attempt to form a communication connection with the network and, when unsuccessful, then generating another Network access identifier of a construction in conformity with the second protocol version forming second content of a second syntax;
   storing in a memory a listing that identifies which of the first and second protocol versions results in successful formation of the communication connection with the network connection; and
   accessing the listing to initiate communication with the network through generation of an access message, the access message having one of the first content and the second content selected responsive to access to the listing; and
   sending the access message.

14. The apparatus of claim 1 wherein each network in the listing of networks is identified by a Mobile Network Code/Mobile Country Code (MNC/MCC).

15. The apparatus of claim 1 wherein the access message generator is configured to generate the first access message without knowledge of the communications protocol used by the network.

16. Apparatus for a dual mode mobile station capable of establishing a communication connection with a Global System for Mobile communications (GSM) network and an Unlicensed Mobile Access/Generic Access Network (UMA/GAN) system to facilitate formation of a communication connection with a UMA network or a GAN network using a protocol appropriate to the UMA network or the GAN network, respectively, and operable to selectively communicate according to either protocol, said apparatus comprising:
   a memory element adapted to store a listing of networks and an indication of an associated protocol used for making a successful previous connection with networks previously encountered, said memory element configured to maintain a table identifying which of the protocol appropriate to the UMA network or to the GAN network results in a success of the formation of the communication connection with the network;
   a UMA/GNC network determiner to decide when a communication connection to one of a UMA and a GNC network is to be made;
   a network access identifier message generator configured to generate a first access message to initiate formation of the communication connection with a first one of the UMA and GNC networks, the first access message having one of first syntactical or second syntactical formats in accordance with the UMA network protocol and the GNC network protocol, respectively, selection of which of the first or second syntactical formats of the first access message made by access to the table; and
   a network access identifier message regenerator configured, responsive to a failure of formation of the communication connection with the first one of the UMA and GNC networks, to generate a second access message having the other of the first syntactical or second syntactical formats in accordance with the other one of the UMA network protocol and the GNC network protocol so as to reattempt initiation of formation of the communication connection.

17. The apparatus of claim 16 further comprising a connection success determiner configured to determine success of the formation of the communication connection responsive to the network access identifier generator.

18. The apparatus of claim 16, further comprising a memory element adapted to store a listing of UMA and GNC networks and an indication of an associated protocol used for making a successful previous connection with UMA and GNC networks previously encountered, said memory element configured to maintain a table identifying which of the first syntactical or second syntactical formats results in success of the formation of the communication connection with the UMA or GNC network.

19. The apparatus of claim 18 wherein said network access identifier message generator is further configured to access the table maintained at said memory element, selection of which of the first syntactical or second syntactical formats to form the first selected one thereof in the access message made by access to the table.

20. The apparatus of claim 18 further comprising a connection success determiner configured to determine success of the formation of the communication connection responsive to the network access identifier message generator and further configured to update the table maintained at said memory element responsive to successful formation of the communication connection.

* * * * *